March 6, 1973   T. L. HEWITT   3,718,985
GROUP INSTRUCTION AUDIO-VISUAL TEACHING SYSTEM
Filed April 1, 1971

INVENTOR
TERRY L. HEWITT
BY Louis A. Moucha

March 6, 1973 T. L. HEWITT 3,718,985

GROUP INSTRUCTION AUDIO-VISUAL TEACHING SYSTEM

Filed April 1, 1971 5 Sheets-Sheet 3

INVENTOR
TERRY L. HEWITT
BY Louis A. Moucha

INVENTOR
TERRY L. HEWITT
BY Louis A. Moncha

United States Patent Office 3,718,985
Patented Mar. 6, 1973

3,718,985
GROUP INSTRUCTION AUDIO-VISUAL
TEACHING SYSTEM
Terry L. Hewitt, Schenectady, N.Y., assignor to
General Electric Company
Filed Apr. 1, 1971, Ser. No. 130,391
Int. Cl. G09b 7/06
U.S. Cl. 35—9 A                                    18 Claims

ABSTRACT OF THE DISCLOSURE

A programming component generates self-clocking digital control signals and records them on one track of a magnetic tape and records analog signals on another track for providing audio information to a group of students. The tape is then utilized in a response component which responds to the digital control signals to provide automatic operations such as remotely operating one or two visual display devices (i.e., a slide projector), and for presenting to the students over a loudspeaker, material in lecture form and, or, multiple-choice questions. The response component is operated by the instructor and includes multiple lamps which display to the instructor the correct answers to the multiple-choice questions.

My invention relates to a teaching system which features audio, visual and multiple-choice response capabilities, and in particular, to a system in which the response component thereof is operated by the instructor and displays to him the correct answers to multiple-choice questions presented to a class of students.

The present application is related to application S.N. 130,397 entitled, "Free-Standing Audio-Visual-Response Teaching System," and to application S.N. 130,386 entitled, "Scanned Audio-Visual-Response Teaching System," concurrently filed with the present application, having the same inventor, and assigned to the assignee of the present invention.

Various techniques are currently being proposed for aiding instructors in their teaching assignments for purposes of increasing their productivity and thereby making it possible for each instructor to teach more students. One of the prior art approaches is the computer-assisted instruction in which a computer is programmed to print out questions and the student literally talks with the computer in providing his answer and is informed of its correctness. The disadvantage of the computer-assisted instruction is the fact that it is very expensive, is most often not provided with audio or visual capabilities, and requires a teletype unit for each student. Other more recent teaching systems include the combination of a phonograph record and slides which has the disadvantage in that the phonograph record is provided with a fixed program and therefore the system is not readily programmable.

Therefore, a principal object of my invention is a teaching system having an audio and visual presentation capability for teaching a group of students from a single component.

Another object of my invention is to provide the system with a component for readily programming a particular assignment with minimum complexity and low cost.

A further object of my invention is to provide the programming component with a conventional two track magnetic tape recorder wherein self-clocking digital control signals are recorded on one track and analog signals on another track.

A still further object of my invention is to provide the response component of the teaching system with the ability to remotely operate one or two visual devices which presents the teaching assignment to the students.

Another object of my invention is to provide the response component with lamps which display to the instructor the correct answer to multiple-choice questions presented to the students in the lesson.

Briefly stated, my invention is a teaching system which includes a programming component and a response component adapted for group instruction. The programming component includes electronic logic circuitry for generating self-clocking digital control signals which are recorded on one track of a magnetic tape, and further includes an audio input for recording analog signals on another track for providing audio information to a group of students. The tape from the programming component is then utilized in the response component which responds to the digital control signals to provide automatic remote operation of one or two visual display devices that further presents instructional material to the students. The response component includes electronic logic circuitry for detecting and decoding digital answer word codes on the tape in response to multiple-choice questions presented to the students in the lesson. The correct answers are displayed to the instructor by the lighting of corresponding lamps on the control panel of the response component.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character, and wherein:

The teaching system in accordance with my invention includes a programming component, and a response component. The programming component permits an instructor to prerecord a lesson on a conventional tape recorder by recording the requisite audio information on the first track of a magnetic tape in the form of analog signals. The instructor then rewinds the tape, plays back the audio, and records self-clocking digital control (command) signals on a second track of the tape at appropriate points in the audio program. The digital control signals direct the operation of one or two visual display devices such as a slide projector or other device capable of presenting a visual display to a group of students. The digital control signals also cause the response component to stop after a quesion has been presented to the students on the visual device display and/or on the audio track of the magnetic tape. Upon the stop in the response component operation, the students may present their answers to the question in any prescribed manner. Only one response component is used in teaching a class of students and such component is operated by the instructor. The response component automatically detects and decodes the correct answer to the question as a digital answer word code on the tape, and displays such answer to the instructor by the lighting of one of a plurality of multiple-choice answer lamps mounted on the response component control panel.

Figure 1A:
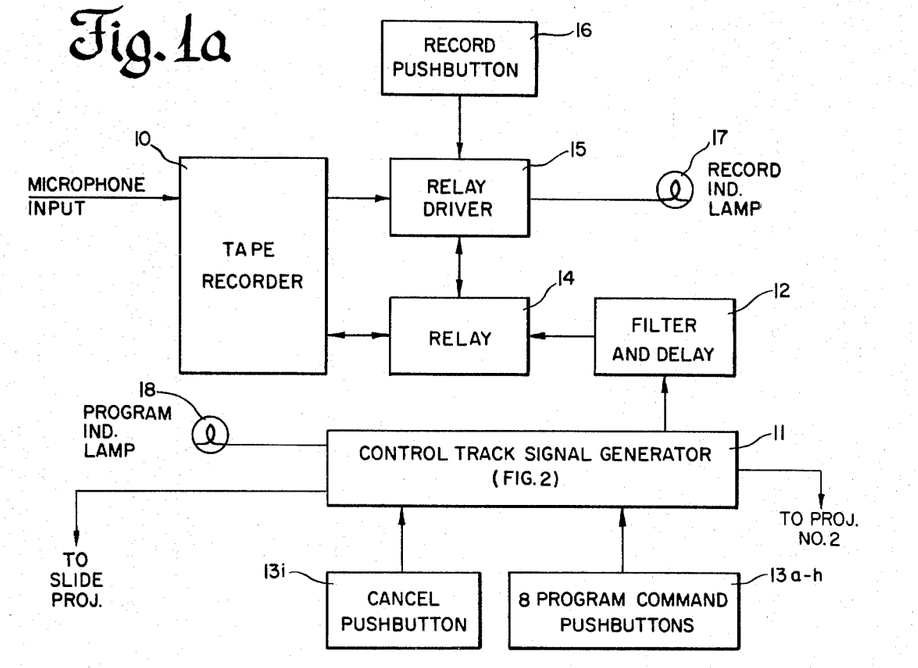
FIG. 1a is a block diagram of the programming component of my teaching system.
Figure 1B:
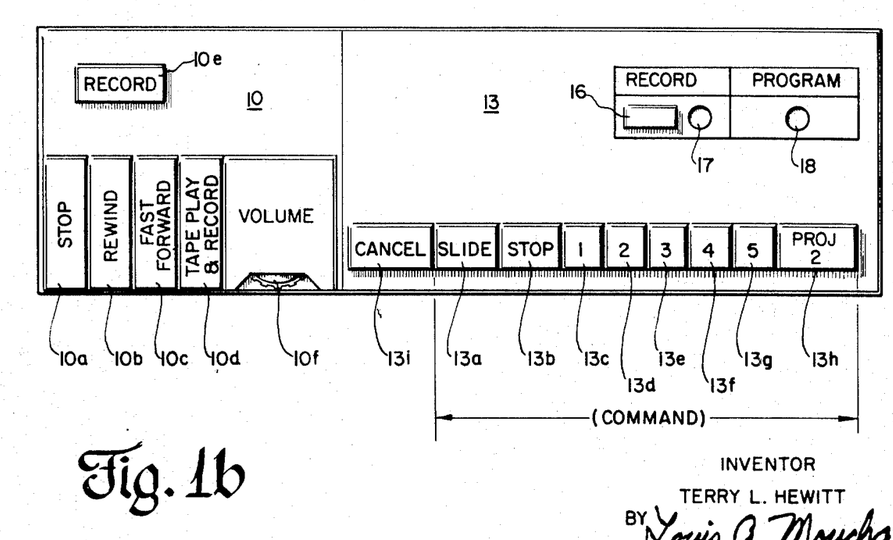
FIG. 1b illustrates the control panel thereof.

Referring now in particular to FIG. 1a there is shown a block diagram of the programming component and FIG. 1b illustrates a typical control panel provided on the programming component. The programming component as well as the response component are each of small size, portable, and each includes an identical conventional cassette tape recorder 10. The digital control signal is coded to provide eight different commands, namely, STOP, for causing the tape recorder to stop, SLIDE, for causing an advance in the visual display device, five for storing answers to multiple-choice questions presented in the lesson, and a PROJ. 2 command for operating a second visual device, or the like. The digital control signal commands are entered simply by pressing and releasing the appropriate one of eight pushbuttons 13a–h on the control panel illustrated on FIG. 1b and labeled SLIDE, STOP, 1, 2, 3, 4, 5, and PROJ. 2, respectively. Errors in the program may be corrected by the instructor on either the audio or digital track, without affecting the other track, by rewinding past the point of error and then rerecording.

One of the novel aspects of my invention is the particular type of digital control signals employed for providing particular automatic operations of the response component. Prior art cassette tape recorders utilize audio signals alone or audio with a single tone for the remote operation of a slide projector wherein the single tone is superposed on the audio track as an audible tone or is recorded on a second track, the tone also adapted for film advance and for stopping operation of the response component.

My use of the aforementioned coding of the digital control signal permits a very simple programming procedure which may be utilized by an instructor having no technical experience in programming thereby rendering my teaching system very versatile. The tape recorder 10 utilizes two-channel, two-track record/playback and erase heads, although the response component tape recorder requires only a two-channel, two-track record/playback head and one channel, two-track erase head. The use of two-channel, two-track playback and erase heads in the programming component tape recorder permits the following operations: audio record and erase, audio playback, audio playback and digital record and erase. Sufficient separation is provided on the magnetic tape between the two channels for isolation between the audio and digital playback signals.

The digital control signals are initially of square wave form, the square waves being generated in a control track signal generator 11. Frequency shaping of the square wave is accomplished in a conventional filter and delay network 12 which includes high and low pass filters to provide a frequency response peaking at approximately 1000 Hertz. A delay circuit in network 12 delays the start of the recording of the digital control signal for approximately one second after the start of the erase signal to assure that the digital signal will always be recorded on erased tape when reprogramming the digital track.

The digital control signal is of the pulse-width-modulated type referred to as 2/6 PWM. In this format, a logic ZERO is represented by a pulse which is 2/8 of a period long, and a logic ONE is represented by a pulse which is 6/8 of a period. The leading edge of each pulse is at a common repetition rate and therefore includes the clock information while the pulse width determines whether the bit is a logic ONE or ZERO. The pulse width modulated signal is generated in the control track signal generator 11 which is described in a more detailed block diagram in FIG. 2. The digital PWM signal is recorded continuously on the second (control) track of the magnetic tape and appears as a series of logic ZEROES at all times other than during the time a command is being recorded. As each command is entered, the corresponding digital word is recorded twice with a short time lapse separating the two words to make more certain that at least one of the words is detected during playback. Logic in the response component prevents the second word having any effect if the first word is detected. Six bit words are used to encode each of the eight commands utilized in my system. Each of these eight words has logic ONES as the first and sixth bits as a requirement for detection of a valid word in the palyback logic of the response component. The remaining four bits are encoded such that any single bit error will be ignored by the detection logic. Thus, the code is as follows:

ANSWER 1: 100011
ANSWER 2: 100101
ANSWER 3: 101001
ANSWER 4: 101111
ANSWER 5: 110001
SLIDE ADVANCE: 111011
STOP: 111101
PROJECTOR NO. 2: 110111

The cassette tape recorder 10 is provided with five pushbuttons and one knurled volume control 10f as illustrated in FIG. 1b. Publications 10a, 10b, 10c and 10d are labeled STOP, REWIND, FAST FORWARD, and PLAY AND RECORD, respectively. Pushbutton 10e is labeled RECORD and must be depressed along with the PLAY and RECORD pushbutton 10d when recording audio in the programming operation.

The programming component includes the cassette tape recorder 10 and programming unit 13. All of the elements in FIG. 1a except for tape recorder 10 are elements of the programming unit 13. The digital signal produced in control track signal generator 11, with each command entered via a corresponding command pushbutton 13a–13h, is passed through filter and delay network 12 and relay 14, and finally to the digital record channel of the record/playback head on the tape recorder. Relay 14 is a 6-pole relay energized (driven) by a transistor circuit 15 during the digital record mode upon the depression of the (digital) RECORD pushbutton 16 on the programming unit. The first contacts of relay 14 switch the digital signal to the digital track of the record/playback head, the second contacts direct a high frequency record bias signal commonly used in audio recording to the appropriate audio or digital track of the record/playback head, the third contacts interrupt an audio signal path in the recorder to prevent interference with the digital recording, the fourth contacts direct the erase signal to the appropriate audio or digital track of the erase head, the fifth contacts switch on an audio oscillator in the tape recorder during digital record which provides the high frequency signal for both the erase and bias functions, and the sixth contacts latch the relay in the digital record mode after the digital RECORD button 16 on the programming unit is momentarily held down and the tape recorder PLAY AND RECORD button 10d is also depressed, resulting in the tape recorder operating and the relay 14 being energized and latching, and the digital signal then being recorded. The relay 14 switching functions are used in order to utilize the circuitry existing in the conventional tape recorder 10 for both audio and digital control signal recording. The digital record mode is indicated by the lighting of RECORD indicator lamp 17, energized by the relay driver circuit 15. A PROGRAM indicator lamp 18 is lit for several seconds after a digital command signal has been recorded to verify such operation. A CANCEL pushbutton 13i permits an erroneously pressed command pushbutton 13a–13h signal to not be recorded. Upon the stopping of the tape recorder by depressing STOP pushbutton 10a, the relay 14 is unlatched and the contacts thereof return to the nonenergized state of the relay.

Figure 2:
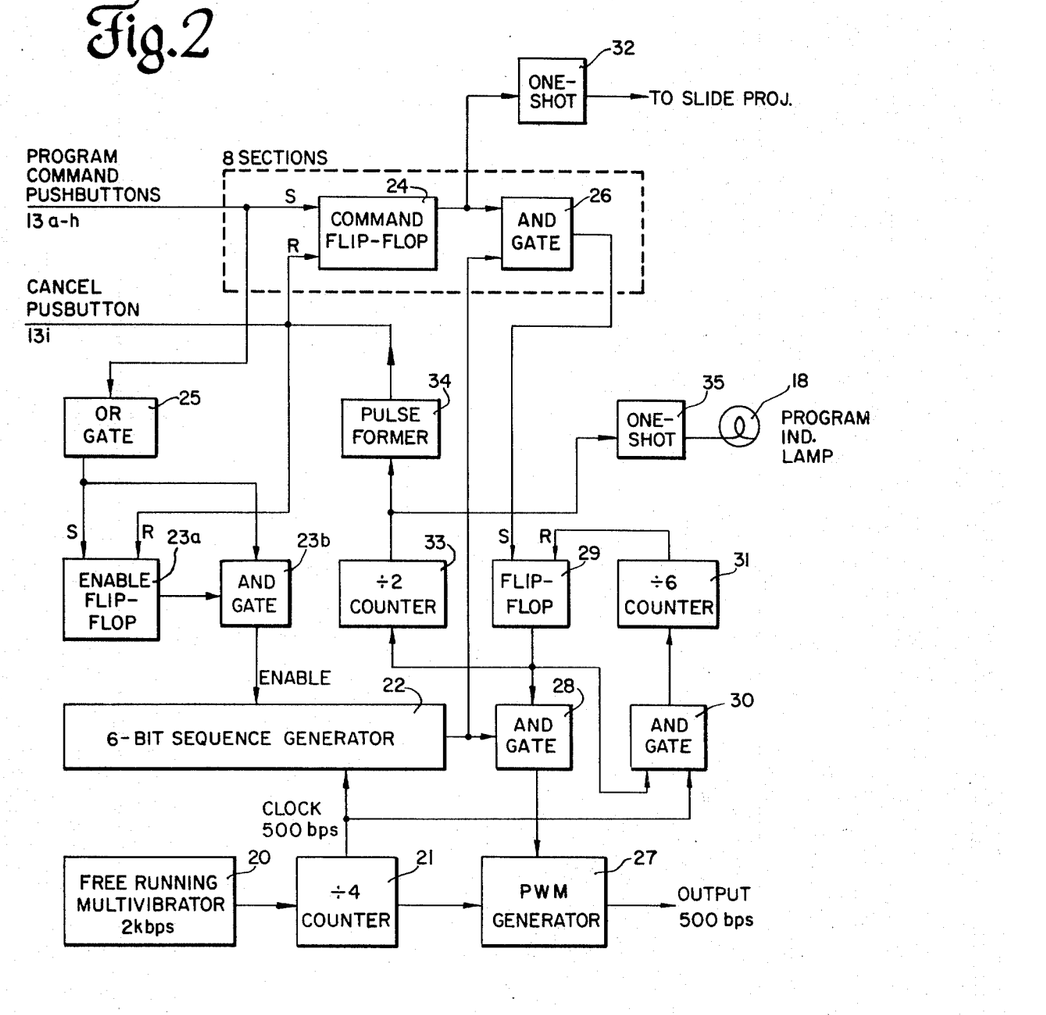
FIG. 2 is a detailed block diagram of the control track signal generator illustrated in FIG. 1.

Referring now to FIG. 2 there is shown a detailed block diagram of the control track signal generator 11 illustrated in FIG. 1 which produces the digital control signal in response to each command entered by means of a corresponding program command pushbutton (PROG.

COMM. PB) 13a–13g. The output of the control track signal generator (output of PWM generator 27) is the digital control signal in the above-described 2/6 PWM format which is then passed through filter and delay network 12 and thence to the digital record channel of the record/playback head via relay 14.

The control track signal generator 11 comprises the majority of the circuitry in the programming unit 13 and can conveniently be contained on one printed circuit board. The repetition rate of the digital control signal is 500 bits per second (b.p.s.) and is determined by a conventional free-running 2000 b.p.s. multivibrator circuit 20, and a conventional divide-by-four counter circuit 21 connected to the output of the multivibrator for reducing the repetition rate to 500 b.p.s. A conventional six-bit sequence generator 22 is clocked at the 500 b.p.s. rate from the output of the divide-by-four counter 21. Sequence generator 22 may conveniently include three dual flip-flops with all the outputs held in the high state (logic one) at all times except when a command is entered. The command is entered by means of the ENABLE input to sequence generator 22 from the output of a flip-flop circuit 23a. As stated hereinabove, a program command is initiated by pressing one of the command pushbuttons 13a–13g. Each of the seven pushbuttons provides an input to the SET(S) input of a corresponding command flip-flop 24 (i.e., there are eight flip-flops 24 in the eight sections indicated by dashed outline although only seven are normally used as mentioned hereinabove) which are normally in the reset state. Pressing one of the command pushbuttons 13a–13g causes the associated flip-flop 24 to have its SET input switched to ground potential whereby the output of the flip-flop is set to the high state. The pushbutton input from each of the seven pushbuttons is also supplied to one OR gate 25 such that when any one of the pushbuttons is depressed, the output of gate 25 is switched to the low state. The output of OR gate 25 is connected to the SET input of the enable flip-flop 23a. Thus, with any one of the command pushbuttons 13a–13g depressed, the output of OR gate 25 goes low and sets the enable flip-flop 23a to cause its output to go high. The output of enable flip-flop 23a is one input to AND gate 23b. The second input to gate 23b is from the output of OR gate 25. In this way, the ENABLE output of AND gate 23b is prohibited from going high until the COMMAND pushbutton is released. The output of AND gate 23b causes the sequence generator 22 to produce a six bit sequence output, the sequence beginning in state 111111 and proceeding through a sequence which provides all 63 possible states excluding the all-zero state (000000).

The appropriate point in the sequence corresponding to the particular one of the pushbuttons 13a–13g which has been depressed, is determined by the eight AND gates 26 having inputs connected from the outputs of command flip-flops 24 and sequence generator 22. The outputs of the eight AND gates 26 are connected together, the common connection is connected to the SET input of a flip-flop 29, and the output thereof connected to an input of AND gate 28. AND gate 28 has its second input connected to the output of the 6-bit sequence generator 22, and thus, the desired digital word code corresponding to the particular depressed command pushbutton is obtained by gating the output of the sequence generator 22 through AND gate 28 at the appropriate point in the sequence at which the desired word code appears. This allows the output from the sequence generator 22 to pass through the pulse-width-modulation (PWM) generator 27 via AND gate 28 for six clock pulses only. The output from flip-flop 29 is connected to AND gate 30 which has its second input supplied with the 500 (b.p.s.) CLOCK pulses developed at the output of divide-by-four counter 21. The output of gate 30 is thus a gated CLOCK signal which is supplied to a divided-by-six counter 31. After six clock pulses have occurred, counter 31 produces an output which resets flip-flop 29 (the output of counter 31 is connected to the RESET(R) input of flip-flop 29) and thereby closes gate 28. This sequence of events permits only six output PWM pulses to appear at the output of PWM generator 27 and then returns the ouput of PWM generator 27 to a sequence of all zeroes.

The output of the particular flip-flop 24 associated with the SLIDE advance command pushbutton 13a is also connected to the input of a one-shot (multivibrator) 32 which produces a pulse signal initiating operation of the slide projector or other visual display device, and in the case of the slide projector, the signal causes the slide projector to advance one slide. The output of the flip-flop 24 associated with the PROJ. 2 pushbutton 13h, if used, can initiate operation of a second visual display device such as a movie projector, as one example.

The CANCEL pushbutton 13i is connected to the common RESET line for the eight flip-flops 24 and thus is a normally open contact which, when closed upon depression of the CANCEL pushbutton, causes the RESET line to be at ground potential thereby resetting any command flip-flops 24 which had been set, and also resetting the enable flip-flops 23a. The CANCEL pushbutton 13i is only effective if it is pressed down while a command pushbutton 13a–13g is being held down since once the command pushbutton is released, the digital word code generation begins (i.e., the digital word code is not generated until the command pushbutton is released).

The purpose of the serially connected divide-by-two counter 33 (connected to the output of flip-flop 29) and pulse circuit 34 are to record each digital command word twice as mentioned hereinabove. The command flip-flops 24 and enable flip-flop 23a are reset after the command has been twice recorded, in response to a pulse produced in circuit 34. One-shot 35 connected to the output of counter 33 lights PROGRAM lamp 18 to vertify that the command word has been entered (recorded).

Figure 3A:
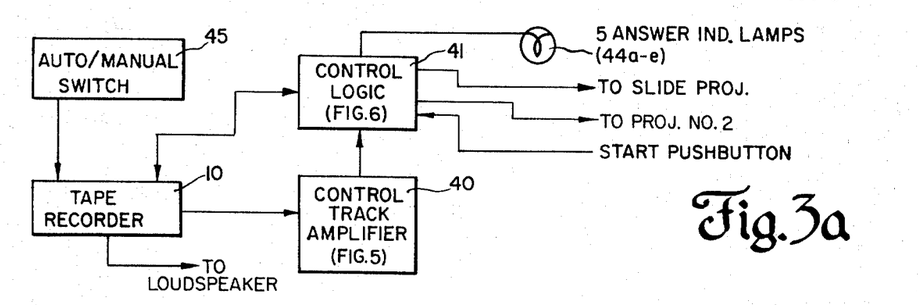
FIG. 3a is a general block diagram of the response component of my teaching system.
Figure 3B:
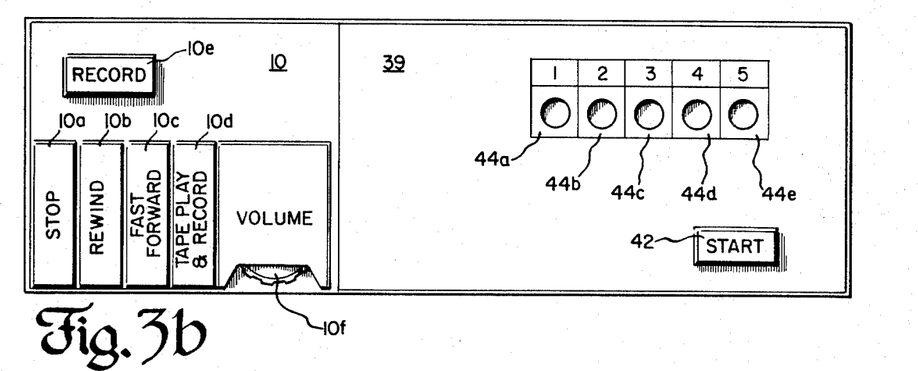
FIG. 3b illustrates the control panel of the response component.

Referring now to FIG. 3a, there is shown a block diagram of the response component, and FIG. 3b illustrates a typical control panel provided on the response component. The response component includes a cassette tape recorder 10 and a response unit 39. The tape recorder 10 is similar to the tape recorder employed in the programming component with the exception that no microphone input is required. A loudspeaker output is utilized for presenting to the students the audio information recorded on the first track of the magnetic tape. A single START pushbutton 42, more clearly seen on the control panel view of FIG. 3b, is used by the instructor for operation of the response component.

The instructor starts the program by pressing the PLAY AND RECORD button 10d on the tape recorder 10 to thereby place the response component in a standby mode with the tape drive off. The lesson in the program is activated by pressing the START button 42 on the response unit, thereby initiating the audio portion of the program as well as the digital portion. The contacts of the START pushbutton assembly 42 are connected to control logic circuitry 41 which detects and decodes the digital signals for performing the operations dictated by such digital signals. The digital control signal is transmitted from the tape recorder 10 to control logic circuitry 41 by way of a control track amplifier 40. Thus, upon activation of the START button 42, the lesson begins, and as one example, the lesson may include a presentation of a first slide, followed by a second slide containing a question and having one of five multiple-choice answers. The first and second slides are successively presented on a screen automatically in response to first and second SLIDE advance common digital control signals programmed on the tape. The audio which accompanies the slides may instruct the students to answer the question in any prescribed manner. Following the second SLIDE advance command signal, a programmed digital control signal representing the correct answer to the multiple-choice question is next detected off the tape, decoded in control logic 41, and this correct answer is displayed to the instructor by the lighting of one of five numbered answer lamps mounted on the response unit control panel as illustrated in FIG. 3b. These lamps 44a–44e (numbered 1–5 respectively on the control panel) correspond to the five possible answers presented to the students. A programmed STOP digital command signal follows the answer signal and automatically stops the tape. The answer lamp remains lit while the tape is stopped and until the tape is restarted by pressing START button 42.

An AUTOMATIC/MANUAL switch 45 determines whether the operation of the response component is automatically controlled by the digital control signal and internal logic. Switch 45 is preferably located on a rear panel of the response unit. In the MANUAL position of switch 45, the response component operation is not automatically controlled.

Figure 4:
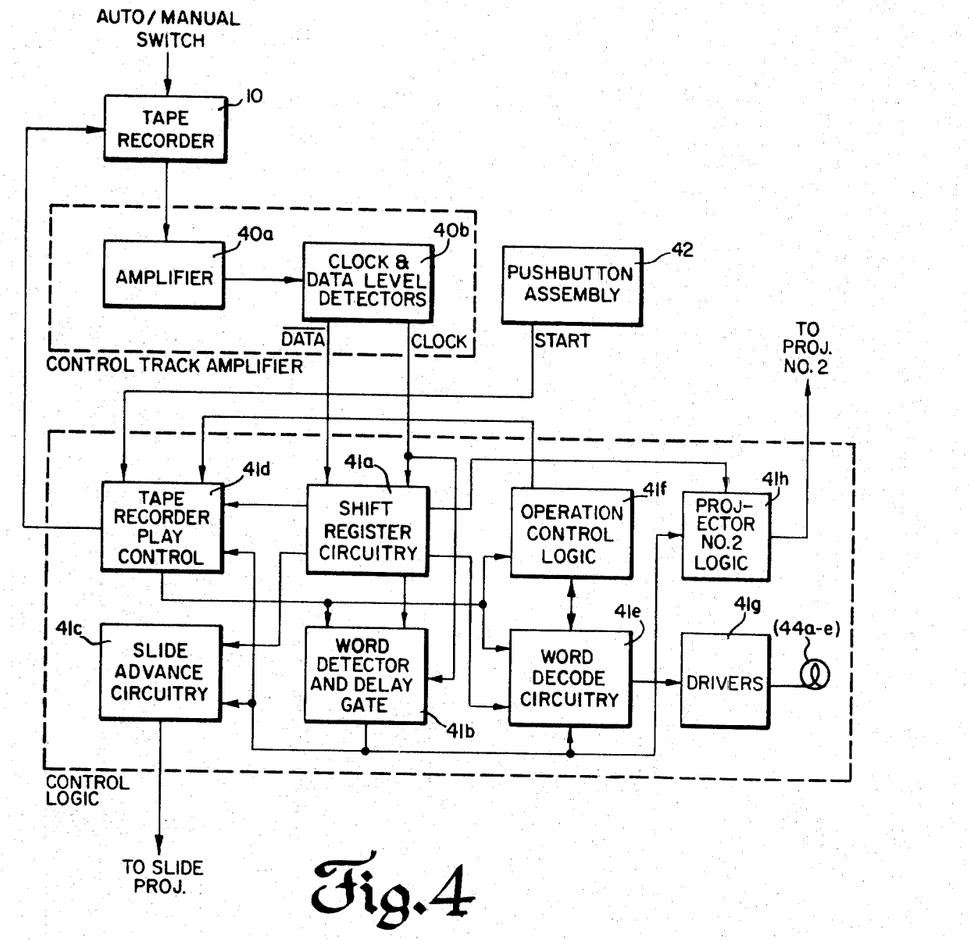
FIG. 4 is a detailed block diagram of the response component.
Figure 5:
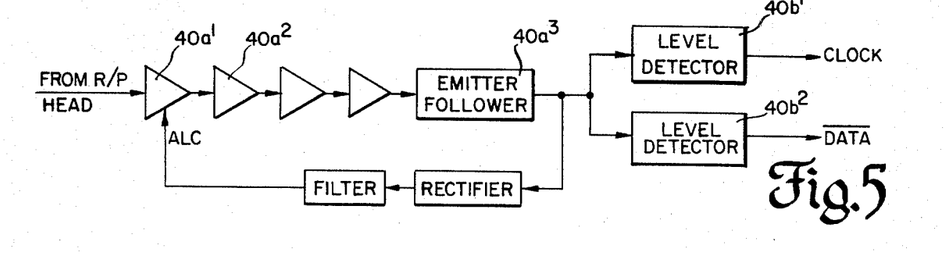
FIG. 5 is a detailed block diagram of the control track amplifier illustrated in FIG. 4.

Referring now to FIG. 4, there is shown a detailed block diagram of the response component. The digital control signal recorded on the second track of the magnetic tape is read off by the playback head of tape recorder 10 and is supplied to the input of control track amplifier 40 which includes an amplifier section 40a and level detector section 40b. The details of the control track amplifier 40 are illustrated in FIG. 5. The amplifier portion 40a includes an automatic level control circuit to maintain the amplifier output at a reasonably constant level. The level detectors 40b detect the positive and negative portions of the amplifier 40a output signal and thereby reconstruct the CLOCK and $\overline{\text{DATA}}$ (PWM generator 27 output) components which form the original PWM signal. The CLOCK and $\overline{\text{DATA}}$ signals at the output of level detectors 40b are supplied to 6-bit shift register circuitry 41a in the control logic 41 portion of the response unit. Outputs from the first and sixth stages of the shift register are supplied to a word detector and delay gate circuit 41b as the first step in extracting the eight command word codes from the digital control signals. A high state output from circuit 41b is produced only when the first and sixth bits are simultaneously high which is a characteristic of the code format described hereinabove and is the first criteria for detection of a valid word. The word detector circuit 41b output and the outputs from the other four stages of the shift register 41a, bits two through five, are the inputs to four logic circuits 41c, 41d, 41e and 41h. The SLIDE word is decoded in the slide advance circuit 41c and results in an output pulse which turns on a silicon controlled rectifier that supplies power to the slide projector to cause it to advance one frame. The STOP word is decoded in the tape recorder play control circuit 41d and results in turning off the tape recorder 10 motor. The binary words for the five MULTIPLE CHOICE answers are decoded in the word decode circuit 41e. The PROJ. 2 word is decoded in circuit 41h.

The delay gate portion of circuit 41b prevents the detection of an erroneous command during periods in which the digital signal is not in a steady-state condition. These periods are usually marked by a transient, noisy signal which occurs whenever the tape recorder starts or stops, and also at the start of the recorded digital signal on the digital track due to the start-up of the tape recorder in the programming unit. The delay gate responds to the CLOCK pulses from the clock level detector 40b, and if no CLOCK pulses are being received, the delay gate holds the output of the word detector 41b both when the tape recorder is stopped and when the tape is moving but there is no recorded signal on the digital track. Upon the arrival of a CLOCK signal, the delay gate causes a delay of several seconds before the hold is removed from the word detector output in circuit 41b.

The prevention of detection of an erroneous command during the slow down condition of the tape recorder when it is being stopped is accomplished by means of an input to the delay gate from the tape recorder play control circuit 41d. Thus, when tape recorder play control circuit 41d receives a STOP command, delay gate 41b produces an immediate hold on the word detector 41b output.

The CLOCK pulse is also used for inhibiting the gating action of logic gates in the word detector circuit 41b in the case wherein such gates could produce false outputs if sampled at the time the shift register is being clocked. This false operation is due to the normal time delays in the logic circuitry and inhibiting these gates from responding at the time of the shift register transitions remedies this false operation.

As the digital control signal is propagated through the shift register 41a, a series of gates in the word decode circuit 41e receive their inputs from the outputs of the second through fifth stages of the shift register and respond to the codes which correspond to the MULTIPLE CHOICE answers. When any one of these five possible codes is detected, a flip-flop in the operation control logic circuit 41f is set and causes a quad latch to hold the information contained in the bits two through five at that time, this information being held until reset by pressing the START pushbutton 42 whereby the tape recorder is again started. Thus, once a MULTIPLE CHOICE signal is detected, the word decode circuit 41e holds the associated information until the tape recorder is restarted by the instructor.

The output from word decode circuit 41e consists of one line for each of the five possible MULTIPLE CHOICE answers, and the five lines are connected to five lamp driving circuits 41g adapted to light the particular one of the five answer indicator lamps 44a–e (numbered 1–5 on the control panel) which corresponds to the correct answer detected in circuit 41e. The START pushbutton 42 is connected to control logic 41 through a pulse forming circuit such that the START signal is transmitted to the control logic 41 as a short pulse occurring at the time the pushbutton is depressed.

Refering now to FIG. 5, there is shown a detailed block diagram of the control track amplifier 40 indicated more generally in FIGS. 3a and 4. The amplifier portion 40a of control amplifier circuit 40 includes four stages of amplification with the first stage $40a^1$ having a first input supplied from the record/playback (R/P) head of the tape recorder. An automatic level control (ALC) is provided by an attenuator between the first $40a^1$ and second stage amplifiers $40a^2$ by means of a feedback loop from the output of an emitter follower $40a^3$ connected to the output of the fourth stage amplifier. The emitter follower functions as an output driver and its output signal is also supplied to the CLOCK and $\overline{\text{DATA}}$ level detectors $40b^1$ and $40b^2$. The ALC feedback lop includes a rectifier and filter to provide a DC voltage to the attenuator. The positive pulses of the output signal of emitter follower $40a^3$ contain the CLOCK information, and the negative pulses contain the $\overline{\text{DATA}}$ information.

Figure 6:
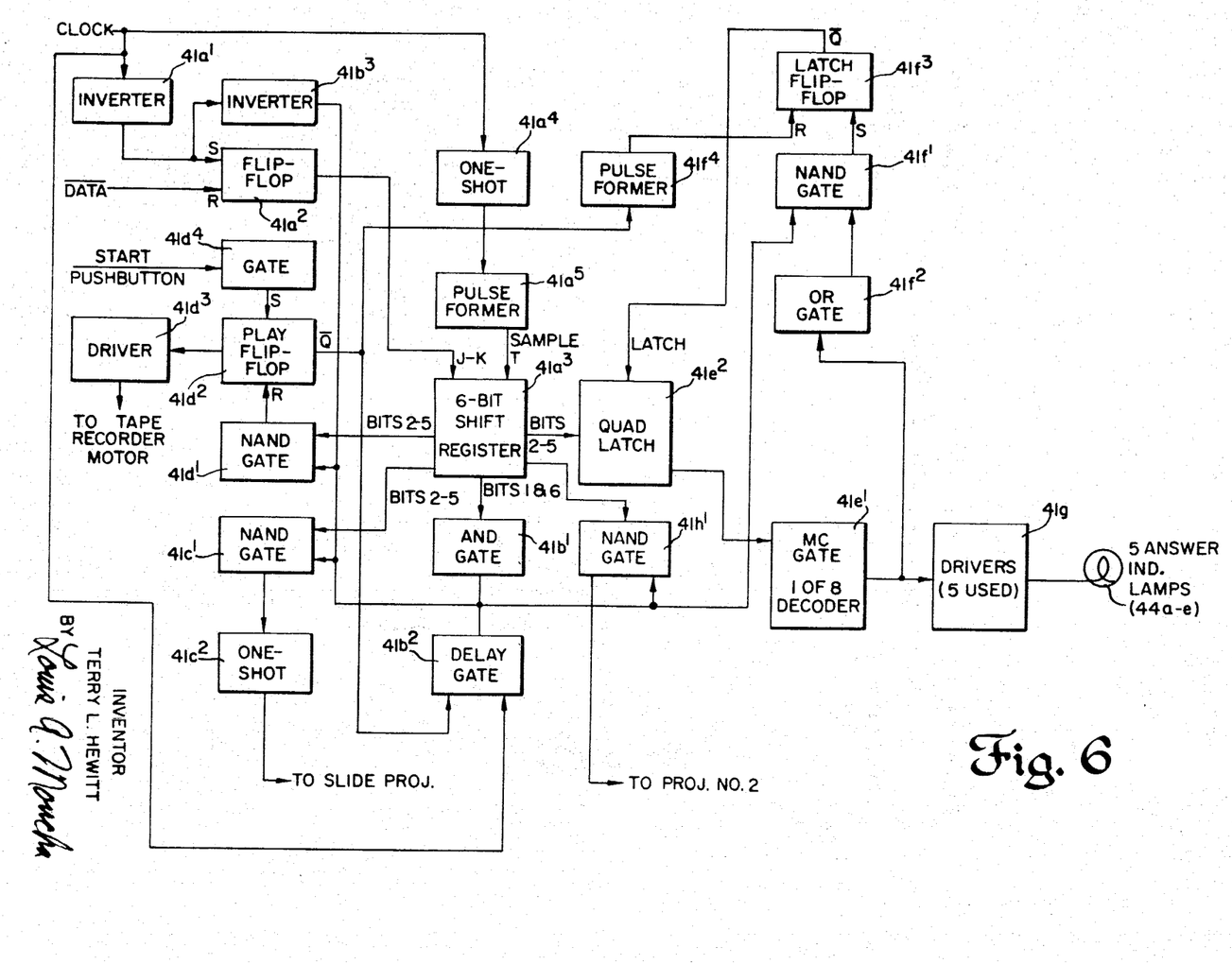
FIG. 6 is a detailed block diagram of the control logic illustrated in FIG. 4.

Referring now to FIG. 6, there is shown a detailed block diagram of the control logic circuit 41 shown generally in FIG. 3a and with some detail in FIG. 4. The CLOCK signal from the output of clock level detector $40b^1$ in the control track amplifier circuit is supplied to inverter $41a^1$ which comprises a transistor. The output of inverter $41a^1$ provides the SET(S) input to a flip-flop $41a^2$, and the $\overline{\text{DATA}}$ signal from the output of the data level detector $40b^2$ provides the RESET(R) input thereto. The output of flip-flop $41a^2$ is the PWM format signal converted into a return-to-zero digital signal and both polarities thereof are supplied to the J–K inputs of six bit shift register $41a^3$. Shift register $41a^3$ is composed of three dual flip-flops. The CLOCK signal from the output of clock level detector $40b^1$ is also supplied to one-shot $41a^4$, and upon triggering thereof, produces a symmetrical square wave at the output thereof. The negative-going transition of this square wave produces an output pulse of about 20 microseconds duration upon passage through pulse forming circuit $41a^5$. This short pulse at the output of circuit $41a^5$ is herein designated as the SAMPLE pulse, and it is supplied to the T input of shift register $41a^3$ for clocking the digital data signal therethrough and thereby converting the return-to-zero output of flip-flop $41a^2$ to a nonreturn-to-zero binary signal propagating through the shift register.

The word detector circuit portion of circuit $41b$ comprises AND gate $41b^1$ having two inputs supplied from the BITS 1 and 6 outputs of shift register $41a$. When the two inputs are both high, the output of gate $41b^1$ is high when permitted by the delay gate portion $41b^2$ of the word detector and delay circuit $41b$ and by inverter $41b^3$ connected to the output of inverter $41a^1$.

The word detector output from AND gate $41b^1$ is supplied to command detection NAND gates $41c^1$, $41d^1$, $41f^1$ and $41h^1$. Second inputs to NAND gates $41c^1$, $41d^1$, $41f^1$ and $41h^1$ are supplied from the BITS 2–5 outputs of shift register $41a^3$. Thus, when the SLIDE advance code word is detected, the gate $41c^1$ output goes low causing a transistor in one-shot $41c^2$ to conduct thereby turning on the silicon controlled rectifier (SCR) which operates the slide projector to cause a single slide advance. When the PROJ. 2 code word is detected, the gate $41h^1$ output goes low and can initiate operation of the second visual display device (i.e., a movie projector, as one example).

The tape recorder play control circuit $41d$ is basically a play flip-flop $41d^2$ which is turned on and off to drive a transistor $41d^3$ that switches the tape recorder motor on and off. Play flip-flop $41d^2$ is set by depressing the START pushbutton whose signal passes through the hereinbefore mentioned pulse forming circuit and gate $41d^4$. Thus, when the START input goes high, play flip-flop $41d^2$ sets and turns on driver transistor $41d^3$ whereby the tape recorder motor is caused to operate. Play flip-flop $41d^2$ is reset by detection of a STOP word in NAND gate $41d^1$. In the case of the AUTO/MANUAL switch 45 being in the MANUAL position, the motor control transistor $41d^3$ is bypassed and all tape recorder operations are controlled directly by the tape recorder pushbuttons $10a$–$e$.

As stated hereinabove, the delay gate in circuit $41b$ illustrated in FIG. 4 prevents the detection of an erroneous command during periods in which the digital signal is not in a steady-state condition. The delay gate $41b^2$ includes transistor circuitry wherein the collector of one of the transistors is connected to the common line output of AND gate $41b^1$ such that whenever this transistor is switched on, the output of AND gate $41b^1$ is held low and none of the command detection gates $41c^1$, $41d^1$, $41f^1$ and $41h^1$ are allowed to operate.

A first holding action on the common line output of word detector AND gate $41b^1$ occurs whenever the tape recorder starts or stops, and also at the start of the recorded digital signal on the digital track due to the start-up of the tape recorder in the programming unit, as mentioned hereinabove. The tape recorder start-up is controlled by delay gate $41b^2$ and is responsive to the CLOCK signal from the output of the clock level detector $40b^1$. When no CLOCK pulses are received, the transistor in the delay gate circuit $41b^2$ is turned on and the common line output from AND gate $41b^1$ is held low. The delay gate circuit $41b^2$ provides a slow-on, fast-off action such that cessation of the CLOCK pulses produces the holding action much quicker than the release of the holding action due to the arrival of a CLOCK pulse, thereby minimizing possible errors due to any gaps in the digital control signals which may have been accidentally or purposely placed in the taped program.

A second input to the transistor in the delay gate $41b^2$ is provided from the $\overline{Q}$ output of play flip-flop $41d^2$ to turn on such transistor and thereby produce an immediate hold on the common line output of AND gate $41b^1$ when NAND gate $41d^1$ detects a STOP command and is reset. This action prevents the control logic from responding to any erroneous signals produced as the tape recorder is slowing down to a stop.

A second holding action on the common line output of word detector AND gate $41b^1$ comes from inverter $41b^3$ which has a CLOCK signal input. Since the SAMPLE pulse which triggers (clocks) shift register $41a^3$ occurs at a fixed time after the CLOCK pulse, the CLOCK pulse never goes high just at the time the shift register is clocked. Therefore, the CLOCK pulse is used by inverter $41b^3$ as a further hold on the common line output of gate $41b^1$ to assure that it cannot go high unless the CLOCK pulse is also high. This gating action prevents any possible false operation due to normal time delays in the logic circuitry during shift register transitions.

As the control signal is propagated through shift register $41a^3$, the BITS 2 through 5 outputs thereof are passed through a quad latch $41e^2$ to the MULTIPLE CHOICE (MC) word decode gate which responds to the five MC word codes. Quad latch $41e^2$ comprises four flip-flops, and when unlatched, passes BITS 2–5 directly through. When latched, quad latch $41e^2$ holds these bits until reset. As long as a latch signal at the $\overline{Q}$ output of latch flip-flop $41f^3$ in the operation logic circuit is high, the latch flip-flop is in the reset condition and the MC BIT 2–5 outputs of shift register $41a^3$ pass directly through quad latch $41e^2$.

The latch flip-flop $41f^3$ is preset by a pulse from pulse forming circuit $41f^4$, the input to circuit $41f^4$ being produced as play flip-flop $41d^2$ turns on. Thus, the first time the play flip-flop $41d^2$ is set, by the instructor pressing the START pushbutton, the $\overline{Q}$ output of the play flip-flop is transmitted to the RESET input of latch flip-flop $41f^3$ to reset it.

When any one of the five MC word codes is detected, an output from gate $41e^1$ is supplied to OR gate $41f^2$ to thereby produce an output which is supplied to command detection NAND gate $41f^1$. The output of gate $41e^1$ is normally low and goes high when an MC word code is detected. If the output from the word detector AND gate $41b^1$ is also high, and all the other holds are removed, both inputs to NAND gate $41f^1$ are high and the output goes low to thereby produce an output to the SET input of latch flip-flop $41f^3$ and cause the $\overline{Q}$ latch output thereof to go low. When the $\overline{Q}$ latch signal is low, the quad latch $41e^2$ is latched and the states if shift register BIT 2–5 outputs (i.e., the MC word codes) are held (stored) in the quad latch.

The five MC word codes are detected by gate $41e^1$ which is a conventional one-of-eight binary decoder integrated circuit. The five outputs of MC gate $41e^1$ (which correspond to the five MC answers) are supplied to five transistor lamp driving circuits $41g$, each of the five circuits $41g$ having its output connected to one of the answer indicator lamps $44a$–$e$ whereby a particular MC answer code causes a corresponding one of the lamps (numbered 1–5 on the control panel) to become lit and remain lit until the tape is restarted.

From the foregoing, it is readily apparent that the objectives set forth have been met. Thus, my invention provides a teaching system having an audio and visual presentation capability provided by the tape recorder and response unit, and includes a means for displaying to the instructor the correct answer to multiple-choice questions presented to a class of students. The programming component is relatively simple to operate and therefore does not require extensive programming expertise on the part of the instructor. These advantages are obtained primarily from my novel use of a two track tape recording wherein self-clocking digtal control signals are recorded on one track, these self-clocking dgital signals in conjunction with the response unit logic commanding various automatic operations such as stopping the program at predetermined points to allow responses by the students to multiple choice questions, and automatically advancing slides in a slide projector interconnected with the response unit. The multiple-choice answers can obviously be less than five in number, if desired. The response component is operated by the instructor and thus the teaching system is especially well adapted for group instruction, and permits an instructor to conduct a multimedia presentation with little training. Although a six-bit word code length has been described herein, other multi-bit word code lengths can be used, the particular bit length being primarily determined by the number of digital commands to be utilized in the program. Also, the bit number lengths of the multi-bit word code and number of stages of the multi-bit sequence generator 22 in the control track signal generator need not necessarily be identical. It should be obvious that in the case of word code lengths of other than six bits, the shift register $41a^3$ would have a bit capacity corresponding to the bits in the multi-bit word code, and the latch circuit $41e^2$ would have a capacity of two bits less. It is, therefore to be understood that changes may be made in the particular embodiment as described which are within the full intended scope of the invention as defined by the following claims.

What I claim as new and desire to secure by Letters Patent of the United States is:

1. An audio and visual teaching system adapted for group instruction and comprising
   a programming component and a response component,
      said programming component adapted to be operated by an instructor and comprising a first two-track tape recorder and a programming unit,
   said first two-track tape recorder comprising
      means for recording analog signals on a first track of a tape in the tape recorder wherein the analog signals represent an audio program to be presented to a group of students,
   said programming unit comprising,
      a control panel provided with a first plurality of command pushbuttons, and
   means in communication with said first plurality of pushbuttons and said first tape recorder for continuously recording pulse-width-modulated self-clocking digital control signals on a second track of the tape, the digital control signals being of equal duration except at appropriate points in the audio program wherein the digital signals represent commands for automatic operations such as remotely operating a visual display device interconnected with said response component and stopping the tape after a question has been presented to the students and for storing the correct answer of a plurality of answer choices to the question, the instructor programming the digital signals by depressing a selected one of said first plurality of pushbuttons corresponding to the particular command to be recorded on the tape,
   said response component also adapted to be operated by the instructor and comprising a second two-track tape recorder and a response unit,
   said second two-track tape recorder comprising
      means for detecting the analog signals recorded on the first track of the tape whereby the audio program is presented to the students,
   said response unit comprising
      a control panel provided with a START pushbutton whereby the instructor controls starting operations of the response component,
   means in communication with said second tape recorder for detecting the pulse-width-modulated self-clocking digital control signals continuously recorded on the second track of the tape,
   means in communication with said digital control signal detecting means for decoding the detected digital control signals to thereby decode the correct answer choice to the question and perform any other commands dictated by the decoded digital signals, and
   means in communication with said digital signal decoding means for displaying to the instructor the correct answer to the question.

2. The audio and visual teaching system set forth in claim 1 wherein
   said means for continuously recording pulse-width-modulated self-clocking digital control signals on the second track of the tape comprises
      a control track signal generator in communication with said first plurality of command pushbuttons for generating a particular multi-bit sequence defining a desired digital word code in response to the particular depressed command pushbutton on the program unit control panel, the leading edge of each digital signal pulse being at the system CLOCK repetition rate thereby including the CLOCK component and the pulse width determining the DATA component of the digital signal, and
   means in communication with an output of said control track signal generator for transmitting the generated multi-bit sequence digital word code composed of pulse-width-modulated self-clocking digital pulses to a record head in said first tape recorder upon depression of a RECORD pushbutton on the program unit control panel, the RECORD pushbutton in communication with said first tape recorder.

3. The audio and visual teaching system set forth in claim 2 wherein
   said control track signal generator comprises
      a free-running multivibrator,
      a multi-bit sequence generator clocked by said multivibrator, and
      first logic circuit means in communication with said programming unit command pushbuttons and said multi-bit sequence generator for producing a multi-bit sequence output therefrom upon one of said command pushbuttons being depressed and released.

4. The audio and visual teaching system set forth in claim 3 wherein
   said control track signal generator further comprises
      a pulse-width generator producing a sequence of all logic ZEROES until interrupted at an appropriate point in the sequence, and
      second logic circuit means in communication with said multi-bit sequence generator and said first logic circuit means for gating the output of said multi-bit sequence generator at the appropriate point in the sequence corresponding to the paticular command pushbutton operated, the gated output of said multi-bit sequence generator in communication with a first input of said pulse-width generator, output of said free-running multivibrator connected to a second input of said pulse-width generator to provide at the output thereof a multi-bit sequence beginning with the desired multi-bit word code corresponding to the particular command pushbutton operated.

5. The audio and visual teaching system set forth in claim 4 wherein
   said control track signal generator further comprises
      third logic circuit means in communication with said free-running multivibrator and said second logic circuit means for closing the gated output of said multi-bit sequence generator after only a particular plurality of pulse-width-modulated pulses appear at the output of said pulse-width generator whereby the output thereof is only a single desired multi-bit sequence word code corresponding to the particular command pushbutton operated, the output of said multi-bit sequence generator held in the logic ONE state at all times except when a command is entered whereby each of the plurality of multi-bit word codes have logic ONES as the first and last bits thereof, the bit number lengths of the multi-bit word code and number of stages of said sequence generator not necessarily being the same.

6. The audio and visual teaching system set forth in claim 2 wherein
said control track signal generator comprises
a free-running multivibrator,
a six-bit sequence generator clocked by said multivibrator,
a plurality of first flip-flops corresponding to the plurality of commands provided by the digital control signals, SET inputs of said first flip-flops connected to the corresponding first plurality of command pushbuttons on the programming unit control panel,
the plurality of command pushbuttons also connected to an input of an OR gate,
output of said OR gate connected to a SET input of a second flip-flop, output of said second flip-flop connected to a first input of a first AND gate, output of said OR gate also connected to a second input of said first AND gate whereby an output of said first AND gate is ineffective until the particular command pushbutton is released, output of said first AND gate connected to an ENABLE input of said six-bit sequence generator to cause said sequence generator to produce a six-bit sequence output when the command pushbutton is released.

7. The audio and visual teaching system set forth in claim 6 wherein
said control track signal generator further comprises
a like plurality of second AND gates having first inputs connected to outputs of corresponding said first flip-flops and having second inputs connected to outputs of said six-bit generator, outputs of said plurality of second AND gates connected to a SET input of a third flip-flop, output of said third flip-flop connected to a first input of a third AND gate,
output of said six-bit sequence generator connected to a second input of said third AND gate whereby a desired digital word code corresponding to the particular depressed command pushbutton is obtained by gating the output of said six-bit sequence generator through said third AND gate at an appropriate point in the sequence at which the desired word code appears,
an output of said third AND gate connected to a first input of a pulse-width generator, said pulse width generator producing a sequence of all logic ZEROES until interrupted at the appropriate point in the sequence, output of said free-running multivibrator connected to a second input of said pulse-width generator to provide at the output thereof the desired six-bit sequence word code in pulse-width-modulated self-clocking digital form.

8. The audio and visual teaching system set forth in claim 7 wherein
said control track signal generator further comprises
an output of said third flip-flop connected to a first input of a fourth AND gate, output of said free-running multivibrator connected to a second input of said fourth AND gate whereby the output of said fourth AND gate is a gated clock signal,
a divide-by-six counter having an input connected to the output of said fourth AND gate and an output connected to the RESET input of said third flip-flop whereby after six clock pulses, said divide-by-six counter resets said third flip-flop and thereby closes said third AND gate thereby permitting only six pulse-width-modulated pulses to appear at the output of said pulse-width generator,
said digital control signal being of the 2/6 pulse-width-modulated type, output of said six-bit sequence generator held in the logic ONE state at all times except when a command is entered whereby each of the plurality of six-bit word codes have logic ONES as the first and sixth bits thereof.

9. The audio and visual teaching system set forth in claims 5 wherein
said programming unit control panel command pushbuttons comprise
a pushbutton providing a command signal for initiating operation of the visual display device,
a STOP pushbutton providing a command signal for stopping the second tape recorder at the appropriate points in the audio program, and
a plurality of MULTIPLE CHOICE answer pushbuttons one of which is selected by the instructor for representing the one correct answer choice of the like plurality of answer choices to the question presented to the students.

10. The audio and visual teaching system set forth in claim 1 wherein
said means for detecting the analog signals being playback means supplying audio signals to a loudspeaker whereby the teaching system is adapted for group instruction.

11. The audio and visual teaching system set forth in claim 2 wherein
said means for detecting the digital control signals comprising
a control track amplifier having an input connected to the playback head of said second tape recorder, said control track amplifier including a pair of level detectors for detecting positive and negative portions of the digital signal and thereby reconstructing the CLOCK and DATA components of the pulse-width-modulated self-clocking digital control signals at the outputs thereof,
a multi-bit shift register circuit having J–K inputs connected to the DATA output of said control track amplifier and having a trigger input connected to the CLOCK output of said control track amplifier, and
a word detector and delay gate circuit, the word detector thereof having inputs connected to the first and last bit outputs of said shift register, the logic ONE state output of the word detector being produced only when the first and last bits are simultaneously logic ONE to thereby satisfy a criteria for detection of a valid command word code.

12. The audio and visual teaching system set forth in claim 11 wherein
said means for decoding the detected digital control signals comprises
a slide advance logic circuit,
a tape recorder play control logic circuit, and
a word decode logic circuit,
outputs of the shift register stages intermediate the first and last bits and the output of said word detector connected to inputs of said slide advance, tape recorder play control and word decode logic circuits,
the decoding of a slide advance command word code in said slide advance logic circuit causing the visual display device to operate,
the decoding of a STOP command word code in said tape recorder play control logic circuit causing the tape recorder to turn off, said response unit control panel START pushbutton connected to said tape recorder play control logic circuit for causing the tape recorder to turn on, and the decoding of a MULTIPLE CHOICE word code in said word decode logic circuit storing therein the correct answer choice to the question presented to the students.

13. The audio and visual teaching system set forth in claim 12 wherein
said word decode logic circuit comprising
a latch circuit having inputs connected to the intermediate bit stages of said shift register, and
a multi-input, multi-output gate circuit, the multi-inputs thereof connected to outputs of said latch circuit which provide the plurality of multiple choice answer word code bits, and
an operation control logic circuit including a latch flip-flop having a SET input in communication with the outputs of the gate circuit in said word decode logic circuit, output of said latch flip-flop connected to a LATCH input of said latch circuit whereby said latch flip-flop becomes set when any of the multiple-choice word codes is detected and thereby causing said latch circuit to hold the data contained in the intermediate bits until reset by a signal developed when the tape recorder has stopped.

14. The audio and visual teching system set forth in claim 13 and further comprising
a plurality of lamps connected to the outputs of said word decode logic gate circuit, said plurality of lamps equal to the plurality of MULTIPLE CHOICE answer pushbuttons on said programming unit control panel whereby the decoded correct answer word code is visually displayed to the instructor by the lighting of the corresponding lamp.

15. The audio and visual teaching system set forth in claim 13 and further comprising
a RESET input of said latch flip-flop in communication with said tape recorder play control logic circuit whereby the data contained in the intermediate bits is held in the latch circuit until the tape recorder has stopped.

16. The audio and visual teaching system set forth in claim 12 and further comprising
the delay gate having a first input from the CLOCK output of said control track amplifier, said delay gate responding to the CLOCK pulses and if none are being received, the delay gate holding the output of the word detector both when the tape recorder is stopped and when the tape is moving but there is no recorded signal on the digital track, the arrival of a CLOCK pulse causing said delay gate to produce a delay before the hold is removed from the word detector output to thereby prevent the detection of erroneous commands during periods in which the digital signal is not in a steady state condition.

17. The audio and visual teaching system set forth in claim 16 and further comprising
a second input to said delay gate from said tape recorder play control logic circuit for prevention of detection of an erroneous command during the slowdown condition of the tape recorder when it is stopped, the detection of a STOP command in said tape recorder play control logic circuit producing an immediate hold on the output of the word detector.

18. A response component adapted for use in an audio and visual teaching system for group instruction and to be operated by an instructor and comprising
a two-track tape recorder and a response unit,
said two-track tape recorder comprising
means for detecting analog signals recorder on the first track of the tape whereby an audio program is presented to a group of students,
said response unit comprising
a control panel provided with a START pushbutton whereby the instructor controls starting operations of the response component,
means in communication with said tape recorder for detecting pulse-width-modulated self-clocking digital control signals continuously recorded on the second track of the tape wherein the digital control signals are of equal duration except at appropriate points in the audio program and represent particular commands,
means in communication with said digital control signal detecting means for decoding the detected digital control signals to thereby decode a correct answer choice to a question presented to the students and perform any other commands dictated by the decoded digital signals, and
means in communication with said digital signal decoding means for displaying to the instructor the correct answer to the question.

References Cited
UNITED STATES PATENTS 3,210,864 10/1965 Tillotson III et al. ..... 35—9A
3,509,549 4/1970 Ohta et al. ..... 340—174.1 H WILLIAM H. GRIEB, Primary Examiner U.S. Cl. X.R.

340—174.1 G, 174.1 H